United States Patent [19]

Ham

[11] Patent Number: 5,897,194

[45] Date of Patent: Apr. 27, 1999

[54] SIGN WITH REMOTE POWER SOURCE TESTER

[76] Inventor: Byung Il Ham, 16550 E. Blackburn Dr., La Mirada, Calif. 90638

[21] Appl. No.: 08/645,849

[22] Filed: May 14, 1996

[51] Int. Cl.$^6$ ........................................... F21V 19/04
[52] U.S. Cl. ........................... 362/20; 362/226; 362/276; 40/570; 200/310
[58] Field of Search .................. 362/812, 20, 226, 362/276, 802; 40/570; 200/310

[56] References Cited

U.S. PATENT DOCUMENTS

| | | | |
|---|---|---|---|
| 3,168,636 | 2/1965 | Smidt | 200/310 |
| 3,203,126 | 8/1965 | Eliot | 362/20 |
| 3,270,164 | 8/1966 | Schubring | 200/310 |
| 3,296,431 | 1/1967 | Green . | |
| 3,309,806 | 3/1967 | Gallagher . | |
| 3,795,830 | 3/1974 | Richardson | 307/311 |
| 3,916,404 | 10/1975 | Gouge | 340/371 |
| 3,931,689 | 1/1976 | Shine | 40/132 R |
| 4,177,500 | 12/1979 | Nicholl et al. | 362/20 |
| 4,201,005 | 5/1980 | Hunt | 40/570 |
| 4,271,408 | 6/1981 | Teshima et al. | 340/702 |
| 4,329,625 | 5/1982 | Nishizawa et al. | 315/158 |
| 4,531,114 | 7/1985 | Topol et al. | 340/539 |
| 4,682,147 | 7/1987 | Bowman | 340/286 |
| 4,711,955 | 12/1987 | Ward et al. | 536/29 |
| 4,727,289 | 2/1988 | Uchida | 315/71 |
| 4,736,138 | 4/1988 | Masaki | 315/310 |
| 4,807,378 | 2/1989 | Bell | 40/576 |
| 4,912,609 | 3/1990 | Gillette | 362/812 |
| 4,929,936 | 5/1990 | Friedman et al. | 340/715 |
| 4,939,426 | 7/1990 | Menard et al. | 315/192 |
| 4,963,798 | 10/1990 | McDermott | 315/312 |
| 5,012,157 | 4/1991 | Walton et al. | 315/66 |
| 5,018,290 | 5/1991 | Kozek et al. | 40/570 |
| 5,047,907 | 9/1991 | Hawkins | 362/311 |
| 5,155,669 | 10/1992 | Yamuro | 362/252 |
| 5,272,605 | 12/1993 | Johnstone | 362/147 |
| 5,303,124 | 4/1994 | Wrobel | 362/20 |
| 5,416,384 | 5/1995 | Bavaro | 315/86 |
| 5,446,440 | 8/1995 | Gleason et al. | 340/331 |
| 5,463,280 | 10/1995 | Johnson | 315/187 |
| 5,467,076 | 11/1995 | Ruocco et al. | 340/571 |
| 5,566,484 | 10/1996 | Wachter | 40/570 |

FOREIGN PATENT DOCUMENTS 2007 732  8/1983  Germany ................. H04M 1/00

*Primary Examiner*—Ira S. Lazarus
*Assistant Examiner*—David Lee
*Attorney, Agent, or Firm*—Blakely Sokoloff Taylor & Zafman

[57] ABSTRACT

An apparatus for remotely verifying the potency of a backup power source for an information display apparatus using an electrically-actuated switch coupled between a primary power source interface and the switch. In one embodiment, a signal receiving device receives a transmitted signal, activates a switch, interrupts the supply of power from a primary power source, and requires the sign to be lighted by the backup power supply. The apparatus may include a circuit to transform alternating current line voltage into a reduced direct current voltage for the lighting source; a backup power supply recharging circuit that is integrated so as to allow the backup power supply to be recharged using power from the primary source; a power failure detector switching circuit that allows the light source to receive power from the backup power supply if the power from the primary power source were interrupted; and a control circuit power source. These components may be integrated upon a circuit board and placed in a housing which has a removable front and displays a message such as "EXIT." A multi-pronged connector may be interfaced to connect the primary power source to the integrated circuitry.

5 Claims, 4 Drawing Sheets

SIGN WITH REMOTE POWER SOURCE TESTER

BACKGROUND OF THE INVENTION

1. Field of the Invention

The invention relates to an information display device, and more particularly to an illuminated information display device incorporating a remotely activated switch that cuts off the primary power source and allows the potency of the backup power supply to be verified.

2. Background

Illuminated information display devices are common in our modern society. They typically are found in buildings and take the form of entrance and exit signs and also signs that inform people of various hazards. Most of these devices are colored light emitting display devices, and employ incandescent lamps as the light source and a colored filter for coloring the display's light. For example, an exit display sign uses an incandescent lamp as the light source. This light source is placed inside a housing which has at least one surface relieved to display the indicia of the word "EXIT." A colored filter is commonly placed between the light source and the relieved area so that the word "EXIT" is displayed in color. The light source is arranged within the housing so that the displayed word is uniformly illuminated.

Information display devices are commonly integrated with the structure of a building. This requires a skilled carpenter and an electrician to mount the device. The "hard-mounting" results in additional cost above the initial expense of purchasing the display device. Additionally, many states have enacted building code requirements that require illuminated information devices, such as exit signs, to be placed both at the floor level and the ceiling level of commercial buildings. Most existing buildings, however, have illuminated signs only at ceiling level. The new building code requirements means costly projects to retrofit existing buildings with floor level signs to comply with the code requirements using the current technology.

Many information display devices, like the entrance or the exit signs, are required to operate day and night for safety and security purposes. This means that the light source must stay illuminated at all times, even during power outages. For this reason, such signs typically include a battery back-up. In many cases, such a back-up power source is mandated by building regulations.

In order to insure that the backup power supply of an information display device is functional, the current technology is to install a manual cut-off switch that disconnects the primary power source from the device. This allows an observer to disconnect the display device from the primary power source and determine whether or not the device remains illuminated by virtue of the backup power supply. Thus, the observer can manually verify whether or not the device will remain lighted in the event the primary power source fails.

FIG. 1 illustrates an example of a circuit diagram for a prior art illuminated information display device with a backup power supply. The circuit shown in FIG. 1 is exemplary of the prior art circuitry for illuminated information display devices. The device 100 is coupled to an external primary power source 105 that illuminates a light source 120. Also coupled to the light source 120 is a secondary power source 130 that is, for example, a battery. Between the external primary power source 105 and the light source 120 is a manual cutoff switch 110. To test the potency of the backup or secondary power supply 130, an observer manually throws manual switch 110 to disconnect the light source 120 from the primary power source 105. Once disconnected from the primary power source 105, the light source 120 is powered by the backup power supply 130. The backup power supply 130 is engaged when a power fail detector 180 senses an absence of power from the primary power source 105. The power fail detector 180 signals a power failure switching device 140 to allow current to flow from the backup power supply 130 through the power failure switching device 140 into the light source 120. The circuit shown in FIG. 1 also includes a recharge circuit 170 that utilizes power from the primary power source 105 to charge the backup power supply 130 when power is supplied by the primary power source. Finally, the circuit of FIG. 1 includes a power transformer 150 to accept an AC voltage and step that voltage up or down, and a rectifier 160 to convert an AC current into a DC current.

As illustrated with the circuit presented in FIG. 1, the prior art illuminated information display devices utilize a manual switch to disconnect the primary power source from the light source. The problem with this technology is that most devices, particularly exit signs, traditionally are located near the ceiling of the area where it is displayed. This location makes maintenance and testing of its battery backup unit extremely difficult. An individual must climb a ladder or similar apparatus to access the illuminated device in order to operate the manual, primary power cut-off switch. This situation not only creates a hazard for the individual on the ladder, but also increases the amount of time required to check the devices and acts to discourage routine checks.

For the foregoing reasons, there is a need for an illuminated information display device that can be easily installed without hard-mounting. Also needed is an information device with a backup power supply, the potency of which may be easily verified remotely.

SUMMARY OF THE INVENTION

The invention is directed to an information display device that satisfies the need for having a simple way to check the potency of the backup power supply for lighted signs. The invention is also directed to an information display device that is easily installed without the need for hard-wiring.

A sign having features of the invention uses a light source, such as an incandescent light bulb or a light emitting diode (LED) that is connected to a primary power source and a backup power supply. Commonly, the primary power source is the 110–120 V alternating current supplied to most U.S. homes and commercial buildings by a local power company. The backup power supply is, for example, a battery. An electrically-actuated switch is placed in a position so that the switch can disengage the primary power source from the light source. When the primary power source is disconnected, power is supplied to the light source by the backup power supply. In a preferred embodiment, the switch is activated to engage or disengage the primary power source when a remote signal sending device transmits a signal to the switch.

In another embodiment, a power step down device is electrically connected between the primary power source and the light source. A backup power supply recharging circuit, a power failure detector/switching circuit, and a control circuit power source are electrically integrated collectively to the switch and the lighting source. This allows the backup power supply to be continually recharged when not in use and for the light source to instantaneously receive power from the backup power supply if the primary power source fails. The entire device may be contained in a plastic or metal housing characteristic of information display devices. The described circuitry can also be mounted on a circuit board, the circuit board acting to electrically connect each of the described components inside the display housing.

In a further embodiment, at least one multi-prong connector is used to electrically connect the circuit to the primary power source. Typically the multi-prong connector is similar to that found on any home appliance which can be connected into a standard wall socket. The multi-prong connector eliminates the need for hard-wiring of the apparatus to the building. An additional benefit is the ease of maintenance and the resultant time savings. The device may be easily removed from the wall for repair and plugged back in after the repair is completed. An additional benefit supplied by the multi-prong connector is the increased physical stability of the apparatus when the system is "plugged" into a wall. The apparatus' stability can be further increased by the use of a fastener, such as a screw, placed through a hole in the housing adjacent to the multi-pronged connector and into the wall socket. Thus, the information display device may be secured like a common striker plate.

BRIEF DESCRIPTION OF THE DRAWINGS

FIG. 3 is a circuit diagram corresponding to the block circuit diagram shown in FIG. 2.

DETAILED DESCRIPTION OF THE INVENTION

An information display device is described. In the following description, numerous specific details are set forth, such as specific circuitry and layout, in order to provide a thorough understanding of the invention. It will be clear to one skilled in the art, however, that these specific details need not be employed to practice the invention.

Figure 1:
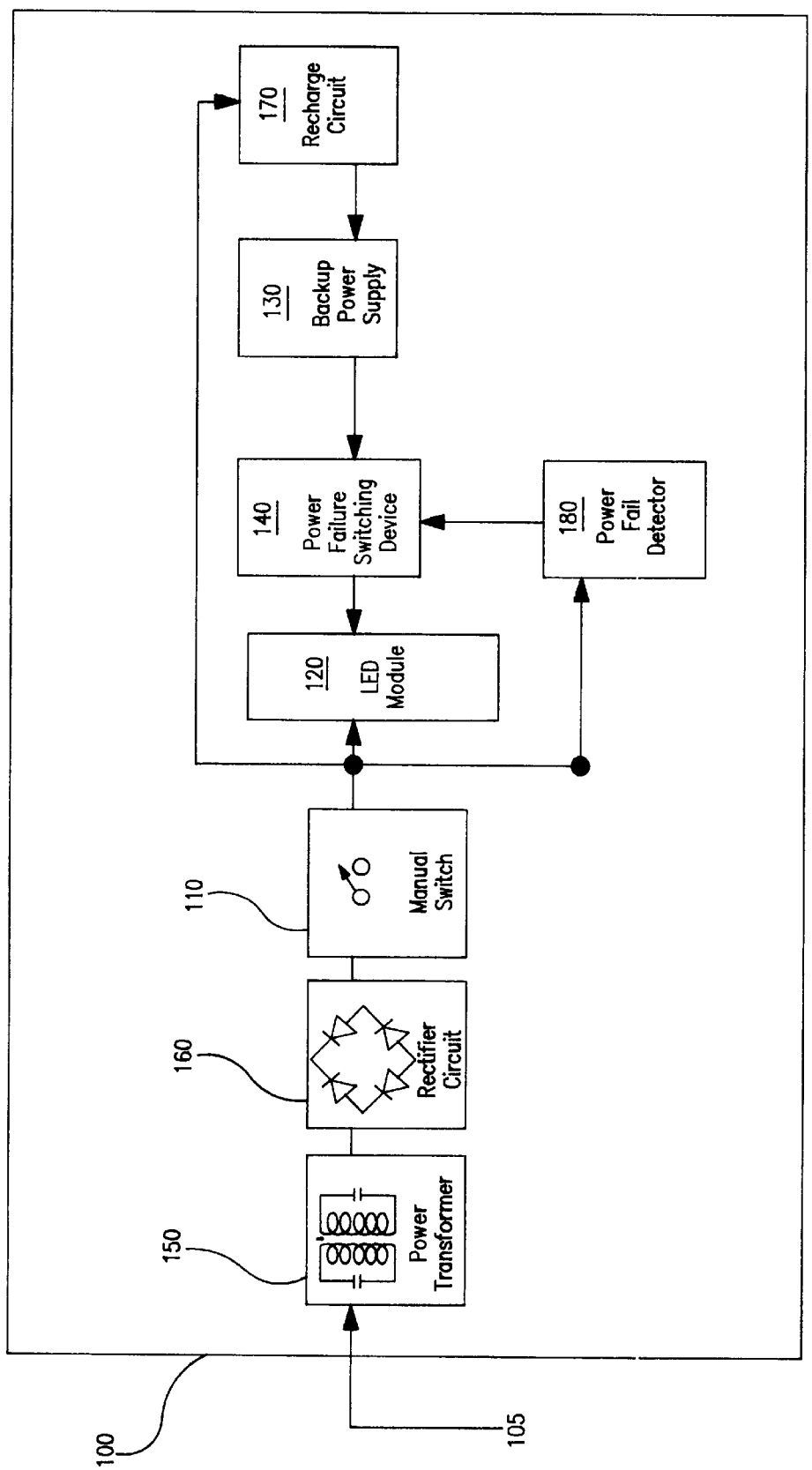
FIG. 1 is a circuit diagram of a prior art information display device.
Figure 2:
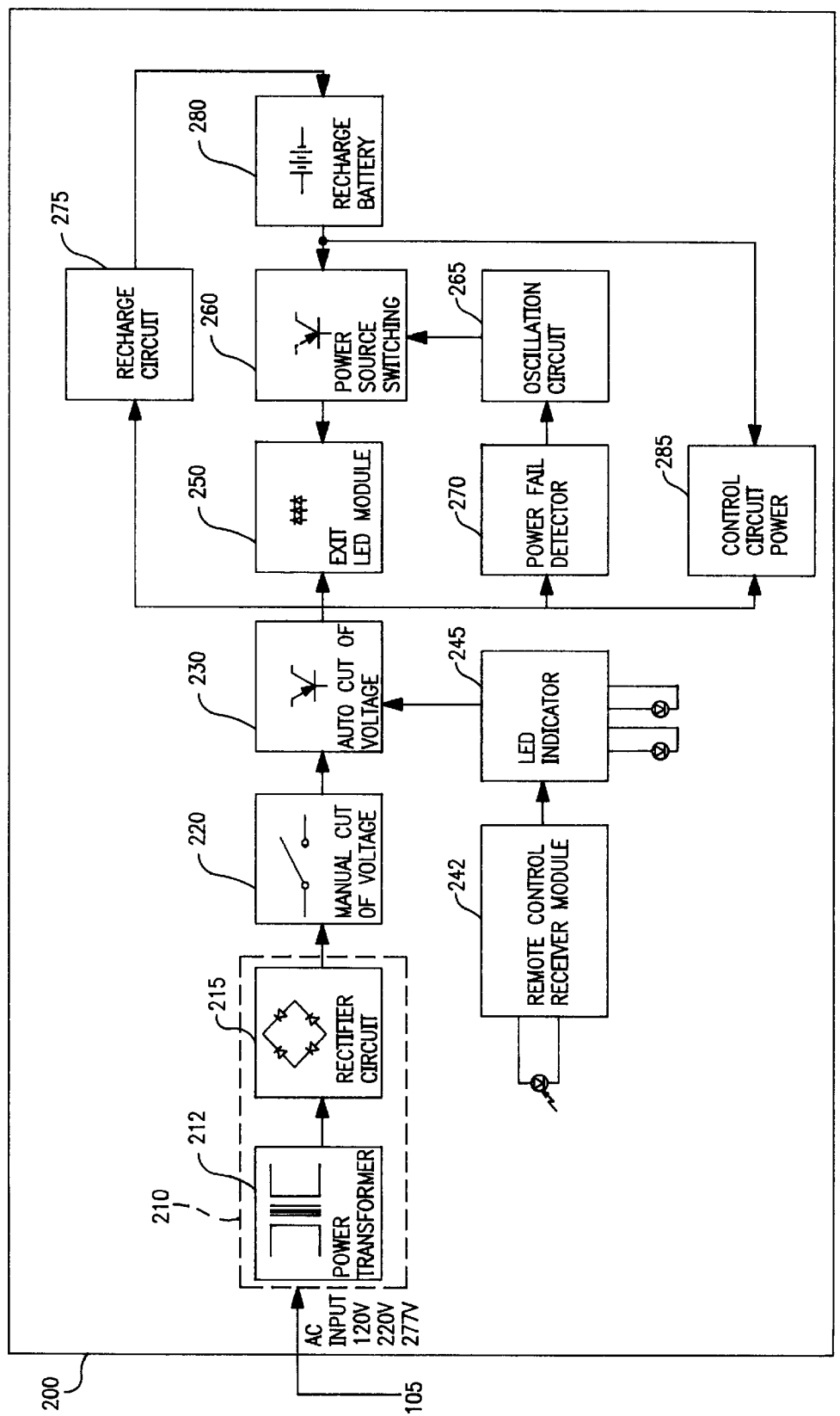
FIG. 2 is a circuit block diagram to be employed in the various embodiments of the present invention.

FIG. 2 shows a block diagram of a circuit used for remotely verifying the potency of a backup power source used in a lighted sign 200. Power from a primary power source 105 is routed through power step down device 210 (illustrated in ghost lines) which is connected through a circuit to one pole of electrically-actuated switch 230. A second pole of switch 230 is connected to a signal receiving mechanism that includes an LED indicator 245 and a signal receiving module 242. The signal receiving module 242 receives a signal from a remote signal transmitter to activate switch 230 and switch between an open and closed position to regulate the current supplied by the primary power source 105. An optional manual cut-off switch 220 is located between the power step down device 210 and the electrically-actuated switch 230 to provide an opportunity to regulate the current to the information display device from primary power source 105 manually.

The primary power source 105 is, for example, the 110 V/120 V electricity supplied by a local electrical company to a modern building, but may also be any voltage available depending on the voltage available in the country where the information display apparatus is installed. The electrically-actuated switch 230 is connected through the circuit to light source 250. The circuit also allows for current from the primary power source 105 to flow to recharge circuit element 275 and to control circuit power unit 285. Recharge circuit 275 in turn is connected to the backup power supply 280, and supplies current to backup power supply 280 on demand. Backup power supply 280 is connected to a power failure switching mechanism, including a power failure detector 270, an oscillation circuit 265, and a power failure switch 260, collectively employed to sense an interruption of current supplied by the primary power source 105 and immediately allow for backup power supply 280 to connect to light source 250. Control circuit power unit 285 is connected in a manner so as complete the circuit and assure operation of power failure switching device 255 if the primary power source supply is interrupted. Control circuit power unit 285 is a power storage device, such as a capacitor.

A power transformer 212 and rectifier circuit 215 typically are configured together as power step down device 210, although it is possible to achieve this purpose with other circuit elements such as a capacitor/resistor arrangement. Signal receiving device 240 may be implemented using, for example, an infra-red receiving sensor 242 adjusted to receive a signal transmitted from a remote signal transmitter. A remote signal transmitter is a hand-held device capable of transmitting infrared signals with the push of a button on the transmitter. Such transmitters are commonly used to, for example, operate a television set and other audio and visual components.

In FIG. 2, signal receiving module 242 is attached to LED indicator 245 which is connected to electrically-actuated switch 230 so that switch 230 may be activated when a remote signal, e.g., an infrared signal, is received from a signal transmitter. An example of a signal receiving module 242 is a KRM-50M infrared module. LED indicator 245 provides a lighted visible signal that allows the position of electrically-actuated switch 230 to be determined on inspection. In FIG. 2, LED indicator 245 includes a pair of LED indicators 247 that indicate the position of switch 230, e.g., open or closed.

Electrically-actuated switch 230 is typified by a single-pole/single-throw arrangement, although other switching arrangements will work. For example, in another embodiment, switch 230 is a transistor. In a further embodiment, switch 230 is a relay. When switch 230 is in the closed position, current from the primary power source 105 flows to light source 250 and throughout the circuit. When switch 230 is open, current from the primary power source 105 does not flow past switch 230.

To test the operation of backup power supply 280, an operator opens electrically-actuated switch 230 by using a remote transmitter. The remote transmitter sends a signal to the signal receiving module 242, which in turn sends a signal to the electrically-actuated switch 230 to open the switch and halt the current to the light source 250 from the primary power source 105. Once the operation of the backup power supply 280 is tested, the operator uses the remote transmitter to signal the signal receiving module 242 to close electrically-actuated switch 230.

The backup power supply is connected to recharge circuit element 275. Recharge circuit element 275 may be of any design that allows for power to be supplied on demand of the backup power supply 280. This allows the potency of the backup power supply 280 to be maintained as long as the primary power source 105 is functional. Contemplated recharge circuit elements are well known in the art.

Sensing an interruption in power from the primary power source and converting to the backup power supply is commonly arranged using a power failure detector 270 joined with an oscillation circuit 265 and a power failure switch 260. In one embodiment, power failure switch 260 is a transistor. In another embodiment, power failure switch 260 is a relay. When power to the information display apparatus is supplied by the primary power source 105 (i.e., the manual switch 220 and the electrically-actuated switch 230 are closed) the power failure switch 260 is open and current cannot flow from the backup power supply 280 to the light source 250. When the power failure detector 270 detects a lack of power from the primary power source 105, the power failure detector 270 sends a signal to the oscillation circuit 265. The oscillation circuit 265 sends a signal to the power failure switch 260, the power failure switch 260 closes, and instantaneously current flows to the light source 250 from the backup power supply 280.

Figure 4:
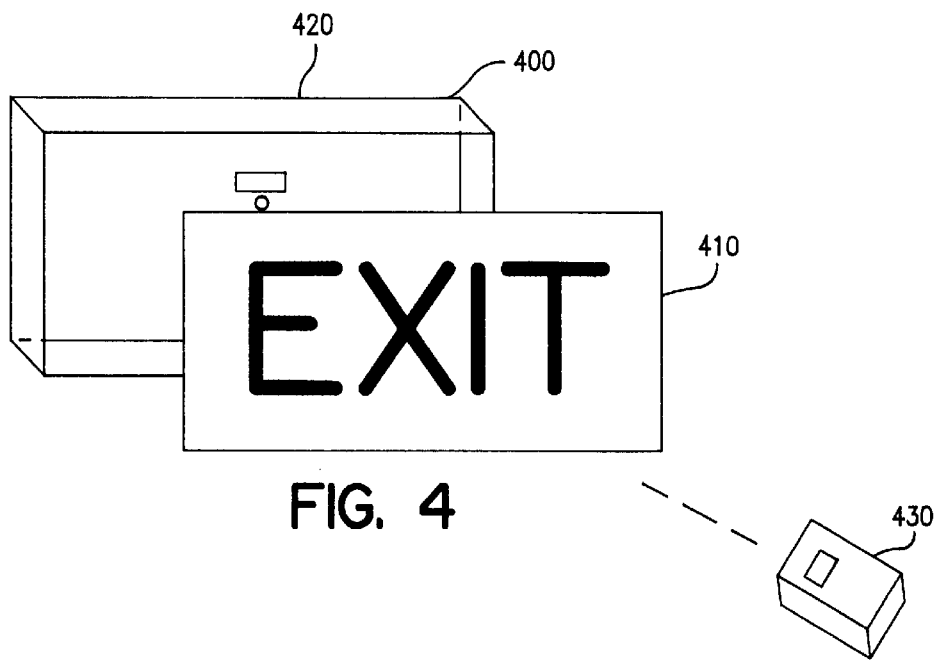
FIG. 4 is a front sectional view of the information display device housing with the removable front wall bearing the indicia of a word.

Light source 250 is required to be of sufficient power to illuminate the translucent material used in one of the relieved housing sides, such as shown in FIG. 4, so that a person looking at the sign could easily read the lettering or design produced by the illuminated transparent material. Incandescent bulb(s) or an LED or LEDs are examples of contemplated light sources. An LED or multiple LEDs provide a more efficient use of power and generate less heat than incandescent bulbs. This allows the apparatus to operate at a lower power level thereby reducing the expense of each of the components, reducing the heat generated by each of the components, and increasing the life of the light source.

Figure 3:
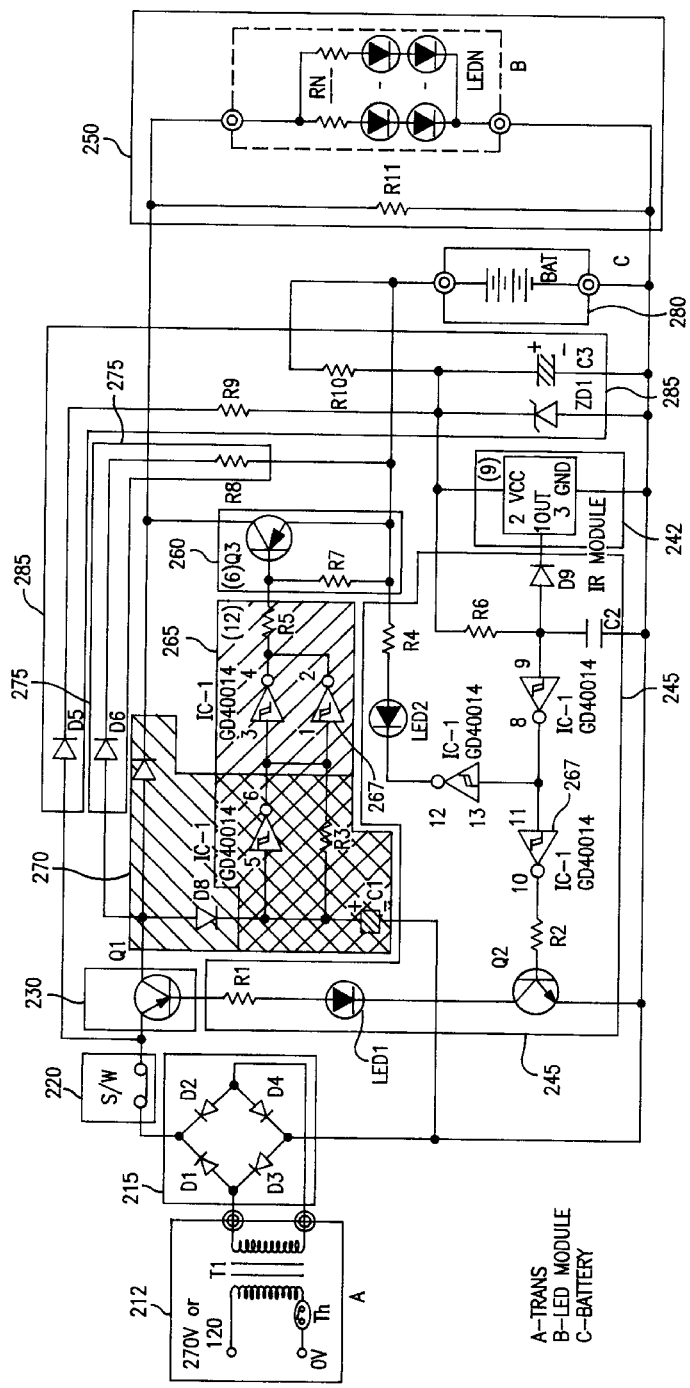
FIG. 3 is a circuit diagram to be employed in the various embodiments of the present invention.

FIG. 3 is a circuit diagram of the block diagram shown in FIG. 2. Each of the blocks illustrated in FIG. 2 is shown in ghost lines over their circuit components in FIG. 3. As can be seen from FIG. 3, the individual circuit components are conventional components so their individual functions will not be described herein. For purposes of recognizing individual components, it is noted that the circuit utilizes Schmitt trigger circuits 267 in the LED indicator 245 and the oscillation circuit 265.

FIGS. 2, 3, 4, 5, and 6, taken together, show an embodiment of an information display device. Housing 400 of FIG. 4 has a multiplicity of sides arranged in such a fashion so as to form an interior cavity, with at least one removable side 410 upon which material has been excised so as to form the indicia of a word or design. In FIG. 4, the information display device is an "EXIT" sign. Housing 400 and its removable side 410 are commonly constructed of a plastic or metal material. The material removed from side 410 to form the indicia of a word is replaced with translucent material, typically red or green in color, allowing light from the inside of the housing 400 produced by lighting source 250 of FIG. 2 to penetrate the material thereby illuminating the word to the outside viewer. FIG. 4 also illustrates a hand-held transmitter 430 that is used to send a signal, e.g., an infrared signal, to sign 400 to actuate switch 230 and change between the primary power source and the backup power source.

The circuit described in detailed FIGS. 2 and 3 is constructed in such a manner to allow the circuitry to fit within housing 400 of FIG. 4. A further embodiment incorporates a circuit board as a mounting and electrical connection for the components of the apparatus. The circuit board is located within housing 400 in such a fashion as to allow the removable front wall 410 to connect to housing 400.

Figure 5:
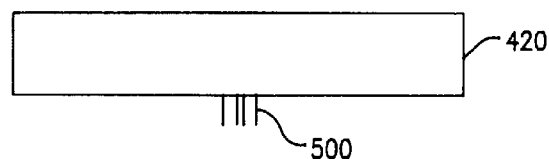
FIG. 5 is a planar top view of the information display device housing illustrating a multi-prong connector extending from the rear wall of the housing.
Figure 6:
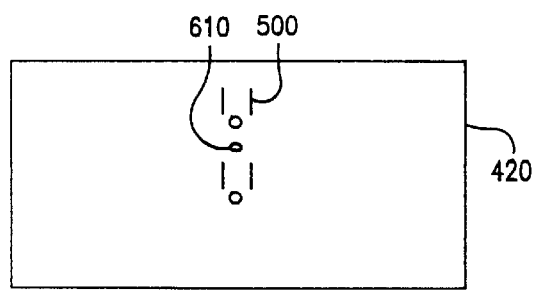
FIG. 6 is a planar side view of the rear wall of the information display device housing illustrating a pair of multi-prong connectors separated by a mounting opening.

FIG. 5 shows a planar top view of the rear portion 420 of housing 400. FIG. 6 is a planar side view of the outer rear wall 420 of housing 400. In the embodiments illustrated in FIGS. 5 and 6, the invention includes at least one multi-pronged connector 500 for the information display device to be attached to the primary power source. This multi-pronged connector 500 permits the apparatus to be interfaced directly with an electrical wall socket or outlet common in most buildings, particularly in the United States. FIG. 6 illustrates the inclusion of an optional opening 610 in the rear wall of the housing 420, between a pair of multi-pronged connectors 500 situated to each enter a common stacked pair electrical outlet. The opening 610 permits a fastener, such as a screw, to attach the housing to the electrical outlet. Placing the opening 610 between a pair of multi-prong connectors allows the rear wall of the housing 420 to be physically attached in the same way that a common striker plate is attached to an electrical outlet.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A sign comprising;

a housing having a rear wall, four adjacent side walls, and a front wall, the rear wall, four adjacent side walls, and the front wall adapted to assemble into a housing, wherein the housing defines an internal area and wherein at least one wall is partially constructed from a translucent material;

a light source located in the internal area of the housing;

a primary power source interface coupled to the light source;

a backup power source coupled to the light source;

an electrically-actuated switch responsive to a remote infrared signal coupled to the primary power source interface, the electrically-actuated switch having a first and a second position; and a second light source coupled to the electrically-actuated switch, the second light source comprising a first light emitting diode and a second light emitting diode wherein the first light emitting diode is adapted to indicate the first position of the electrically-actuated switch and the second light emitting diode is adapted to indicate the second position of the electrically-actuated switch.

2. The sign of claim 1, further comprising a means for coupling the primary power source interface to a primary power source.

3. The sign of claim 2, wherein the means for coupling is a multi-pronged connector.

4. The sign of claim 3, wherein the multi-pronged connector extends from a wall of the housing.

5. The sign of claim 4, further comprising a means for fastening the rear wall of the housing to one of an electrical wall socket and a wall.

* * * * *

UNITED STATES PATENT AND TRADEMARK OFFICE
CERTIFICATE OF CORRECTION

PATENT NO.  : 5,897,194
DATED       : April 27, 1999
INVENTOR(S) : Ham

It is certified that error appears in the above-identified patent and that said Letters Patent is hereby corrected as shown below:

In column 4, line 50, delete "open or dosed" and insert
-- open or closed -- .

Signed and Sealed this

Thirteenth Day of February, 2001

Attest:

NICHOLAS P. GODICI

Attesting Officer        Acting Director of the United States Patent and Trademark Office